United States Patent Office 2,709,701
Patented May 31, 1955

2,709,701

BISNORCHOLANYL - PHENYLTHIAZOLES AND PROCESSES FOR THE PRODUCTION THEREOF

Raymond M. Dodson, Park Ridge, Ill., assignor to G. D. Searle & Co., Chicago, Ill., a corporation of Illinois No Drawing. Application May 5, 1953,
Serial No. 353,223

11 Claims. (Cl. 260—239.5)

This invention relates to polycyclic thiazole derivatives, their acid addition salts, and processes for the production thereof. In particular, it relates to thiazole derivatives of the formula

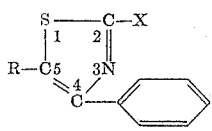

wherein R is a bisnorcholanyl radical which may be hydroxylated or acetoxylated, and X is an amino or acyl-substituted amino radical.

The compounds of this invention are useful chemotherapeutic materials in the field of cardiac pathology. In particular, they are valuable because of their digitalis-like activity, showing marked capacity for myo-cardial stimulation in instances of insufficiency associated with the failing heart. Additionally, they are potent antihormonal agents.

The cyclopentanopolyhydrophenanthrene radicals comprehended by R as defined in the foregoing general formula comprise those which may be regarded as derived from bisnorcholane by displacement of a hydrogen at $C_{22}$, and may be represented by the formula

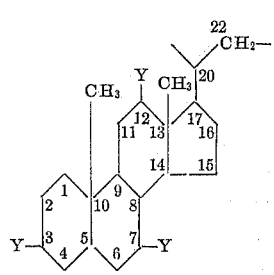

wherein Y may be hydrogen or a hydroxyl or acetoxyl group. R is thus seen to include such radicals as bisnorcholanyl, bisnorlithocholyl, 7-hydroxybisnorcholanyl, 12-hydroxybisnorcholanyl, bisnorchenodesoxycholyl, bisnordesoxycholyl, bisnorisodesoxycholyl, and bisnorcholyl, as well as 3-acetoxybisnorcholanyl, 3,12-diacetoxybisnorcholanyl, and 3,7,12 - triacetoxybisnorcholanyl. Other radicals within the meaning of R as hereinbefore defined will be apparent to those skilled in the art.

X, as defined in the general formula above, refers to the unsubstituted amino radical, and to N-acetylamino, N-propionylamino, N-benzoylamino, and other like acyl-substituted amino radicals.

It follows from the foregoing formulae and definitions that among the substances comprising my invention are:

2 - amino - 5 - [22 - (3,12 - diacetoxybisnorcholanyl)]-4-phenylthiazole, which has the formula

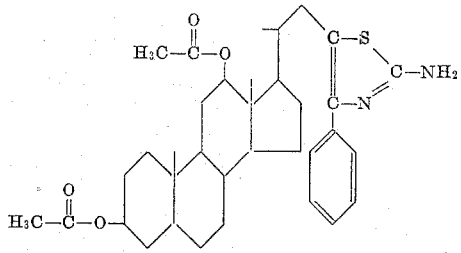

2 - (N-benzoylamino) - 5 - [22 - (3,12 - diacetoxybisnorcholanyl)]-4-phenylthiazole, which has the formula

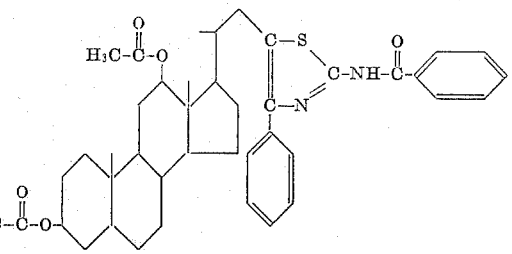

2 - amino - 5 - (22 - bisnorcholyl) - 4 - phenylthiazole hydrochloride, which has the formula

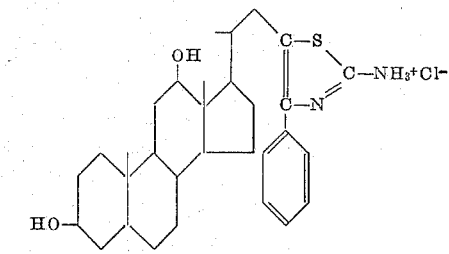

2 - amino - 5 - (22 - bisnorcholanyl) - 4 - phenylthiazole, which has the formula

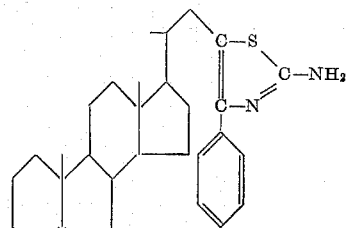

and 2-(N-acetylamino)-5-(22-bisnorcholanyl)-4-phenylthiazole, which has the formula

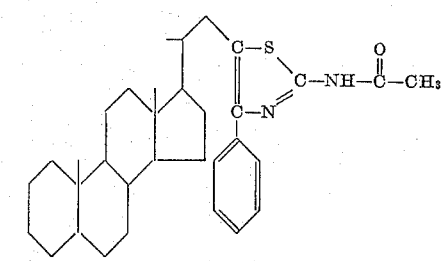

In the form of acid addition salts, these substances are soluble in dilute propylene glycol and may be administered parenterally. As free bases, they may be taken by mouth. Among the acids with which the unacylated amino compounds of this invention form addition salts are such inorganic and strong organic acids as hydrochloric, hydrobromic, nitric, sulfuric, phosphoric, sulfamic, tartaric, maleic, malic, citric, ascorbic, and the like.

The compounds to which this invention relates may be prepared, starting with a norcholanyl phenyl ketone obtainable by the method of Hoehn and Moffett, "Journal of the American Chemical Society," 67, 740–743 (1945), as follows: The norcholanyl phenyl ketone is halogenated at $C_{23}$ by interaction with, for example, bromine—in glacial acetic acid or other relatively inert, anhydrous, organic medium—at moderate temperatures which tend to vary inversely with the length of the reaction time, room temperature for 10 minutes being one efficacious combination of temperature and time. Other solvents which may serve in this reaction are carbon tetrachloride, chloroform, ether, and methylene chloride. The permissible temperature range is —10° to +50° centigrade. The 23-halonorcholanyl phenyl ketone thus obtained is condensed with thiourea by refluxing in a lower alcohol for periods of time ranging from 30 minutes to 8 hours, whereupon the resultant 2-amino-5-(22-bisnorcholanyl)-4-phenylthiazole—one of the compounds of this invention—may be further purified by recrystallization from solvents such as methanol and benzene.

The corresponding thiazole derivatives wherein the bisnorcholanyl portion of the molecule carries a hydroxyl or acetoxyl group at one or more of positions 3, 7, and 12, may be prepared by this same technique, starting with the appropriately acetoxy-substituted norcholanyl phenyl ketone, and taking care that said hydroxyl groups, if any, are protected—by esterification or the equivalent—during the halogenation procedure. Thus, 3,12-diacetoxynorcholanyl phenyl ketone, prepared according to Hoehn and Moffett, loc. cit., may be smoothly brominated in acetic acid medium to give 23-bromo-3,12-diacetoxynorcholanyl phenyl ketone, which, in turn, may be condensed with thiourea to yield 2-amino-5-[22-(3-12-diacetoxybisnorcholanyl)]-4-phenylthiazole, another of the products of this invention.

The acetoxy derivatives may be readily converted to corresponding hydroxy compounds by saponification in aqueous alcoholic medium with a basic reagent such as potash, caustic soda, potassium carbonate or the like. The reaction is generally completed in from 1 to 5 hours at temperatures between 65 and 100° centigrade.

Simple admixture of an inorganic or strong organic acid with the unacylated amino compounds of this invention generally serves for the preparation of the addition salts thereof, although auxiliary heating may occasionally be advantageous.

The acyl derivatives of the amino thiazoles contemplated herein are readily available by interaction of the particular primary amine with the acid chloride or anhydride of choice, care being taken to protect, by preliminary esterification or other suitable means, any nuclear hydroxyl groups present. The reaction is ordinarily carried out in pyridine solution at laboratory temperatures and is completed in from 1 to 3 hours. Solvents such as chloroform, carbon tetrachloride, ether, and dioxane may also be used.

The following examples will illustrate in detail certain of the thiazole derivatives which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

A. *23 - bromo - 3,12 - diacetoxynorcholanyl phenyl ketone.*—A solution of 268 parts of 3,12-diacetoxynorcholanyl phenyl ketone—prepared according to the technique of Hoehn and Moffett, loc. cit.—in 4470 parts of glacial acetic acid, is reacted at room temperature with 80 parts of bromine dissolved in 800 parts of glacial acetic acid. The bromine color disappears after a few minutes, whereupon the reaction mixture is poured, with stirring, into 11,000 parts of water. The dark solid thus precipitated is recovered on a funnel and washed thereon with water. The crude product, dried in air and then crystallized from acetone, affords a good yield of 23-bromo-3,12-diacetoxynorcholanyl phenyl ketone, M. P. 223–225° C.

B. *2 - amino - 5 - [22 - (3,12 - diacetoxybisnorcholanyl)]-4-phenylthiazole.*—A solution of 75 parts of 23-bromo-3,12-diacetoxynorcholanyl phenyl ketone and 75 parts of thiourea in 2400 parts of alcohol is heated at reflux temperature for 3 hours. The reaction mixture is thereupon poured into water and then made basic with aqueous ammonium hydroxide. The product so precipitated is recovered on a funnel and dried in air. The desired 2-amino-5-[22-(3,12-diacetoxybisnorcholanyl)]-4-phenylthiazole thus obtained is crystallized from alcohol, using decolorizing charcoal in process.

C. *2 - amino - 5 - (22 - bisnordesoxycholyl) - 4 - phenylthiazole.*—The acetoxy compound of the preceding part B is diluted with 7900 parts of alcohol, 500 parts of potash is then added, and the resultant mixture is refluxed for 1 hour. The basic reaction mixture is thereupon neutralized with acetic acid, following which sufficient water is added to the still hot reactants to induce cloudiness. Upon cooling, a crystalline precipitate is thrown down. This precipitate, crystallized from dilute alcohol and then from a mixture of benzene, alcohol, and petroleum ether, affords pure 2-amino-5-(22-bisnordesoxycholyl)-4-phenylthiazole.

*Example 2*

*2 - (N - benzoylamino) - 5 - [22 - (3,12 - diacetoxybisnorcholanyl)]-4-phenylthiazole.*—To a solution of 10 parts of the acetoxyamine of Example 1B, in 160 parts of pyridine is cautiously added 200 parts of benzoyl chloride. The reaction mixture is allowed to stand for 2 hours, then poured into water. 2-(N-benzoylamino)-5-[22-(3,12-diacetoxybisnorcholanyl)]-4-phenylthiazole precipitates as an amorphous solid.

*Example 3*

A. *23 - bromo - 3,7,12 - triacetoxynorcholanyl phenyl ketone.*—A mixture of 370 parts of 3,7,12-triacetoxynorcholanyl phenyl ketone, 99 parts of bromine, and 7290 parts of glacial acetic acid is allowed to react at room temperature for 20 minutes. The bromine color disappears in process. The reactants are poured with stirring into 14,000 parts of water and the material thereupon precipitated is recovered on a funnel. The damp solid is taken up in 3500 parts of ether, the aqueous layer which forms is drawn off, and finally the ether solution, dried over sodium sulfate, is evaporated. The solvent-free residue is the desired 23-bromo-3,7,12-triacetoxynorcholanyl phenyl ketone. It may be crystallized from acetone.

B. *2 - amino - 5 - [22 - (3,7,12 - triacetoxybisnor - cholanyl)] - 4 - phenylthiazole.*—A solution of 50 parts of 23-bromo-3,7,12-triacetoxynorcholanyl phenyl ketone and 100 parts of thiourea, in 1000 parts of isopropyl alcohol, is heated at reflux temperature for 5 hours. The solution is then poured into dilute, aqueous ammonium hydroxide and the material thus precipitated is filtered off and finally extracted with ether. The ether solution is reacted with successive portions of 10% aqueous hydrochloric acid until a sample of one such portion fails to yield a precipitate on neutralization with alkali. The various acid solutions, together with any material insoluble therein, are combined (the ether raffinate having been discarded) and the mixture is brought to neutrality with dilute, aqueous ammonium hydroxide. The insoluble 2 - amino - 5 - [22 - (3,7,12 - triacetoxybis - norcholanyl)] - 4 - phenylthiazole so obtained is recovered on a funnel and dried in air.

C. *2 - amino - 5 - (22 - bisnorcholyl) - 4 - phenylthiazole hydrochloride.*—The acetoxy compound of the preceding part B is saponified by refluxing for 2 hours with 50 parts of potash and 800 parts of alcohol. The solution is poured into water, a slight excess of acetic acid is then added, and finally the liquid is brought to neutrality with dilute aqueous ammonium hydroxide. The resultant precipitate is separated by filtration and then purified by repeated crystallization from a mixture of alcohol, ether, and petroleum ether. The resultant 2-amino-5-(22-bisnorcholyl)-4-phenylthiazole shows M. P. 176–184° C. It is converted to the hydrochloride by treatment with 1 equivalent of alcoholic hydrochloric acid solution, the resultant salt, upon crystallization from dilute aqueous alcohol, having M. P. 194–197° C.

*Example 4*

A. *23 - bromonorcholanyl phenyl ketone.*—A mixture of 88 parts of norcholanyl phenyl ketone, 33 parts of bromine, and 2800 parts of glacial acetic acid, is heated for 15 minutes at 65–70° C. The reaction mixture is then poured into 2 volumes of water and allowed to solidify. The precipitate is filtered off, washed with water, and finally dried at 25° C. Crystallization from 540 parts of hot acetone and just sufficient water to induce cloudiness, gives the desired 23-bromonorcholanyl phenyl ketone, M. P. 107–111° C.

B. *2 - amino - 5 - (22 - bisnorcholanyl) - 4 - phenyl - thiazole.*—A solution of 5 parts of the bromo compound of the preceding part A in 100 parts of isopropyl alcohol is refluxed for 2 hours with 10 parts of thiourea. The solution is poured into dilute, aqueous ammonium hydroxide and the insoluble product is then separated by filtration. The crude amino thiazole so obtained is dissolved in ether, following which the ether solution is reacted with an excess of dilute, aqueous hydrochloric acid, whereupon the insoluble hydrochloride thus precipitated is recovered on a funnel. The hydrochloride is then taken up in methyl alcohol and this solution is poured into dilute, aqueous ammonium hydroxide. The resultant precipitate is separated by filtration and crystallized from a mixture of methyl alcohol and benzene. The 2-amino-5-(22-bisnorcholanyl)-4-phenylthiazole so obtained has M. P. 210–211° C.

*Example 5*

*2 - (N - acetylamino) - 5 - (22 - bisnorcholanyl) - 4 - phenylthiazole.*—The amino thiazole of the preceding Example 4B is converted to the acetamido compound by treatment of 3 parts thereof with 50 parts of pyridine and 50 parts of acetic anhydride at 25° C. for 2 hours. The reaction product is poured into water and the material thus precipitated is separated by filtration. Drying and subsequent crystallization from a mixture of benzene and methyl alcohol gives pure 2-(N-acetylamino)-5-(22-bisnorcholanyl)-4-phenylthiazole, M. P. 226–228° C.

I claim:

1. A member of the group consisting of bisnorcholanylthiazole compounds of the formula

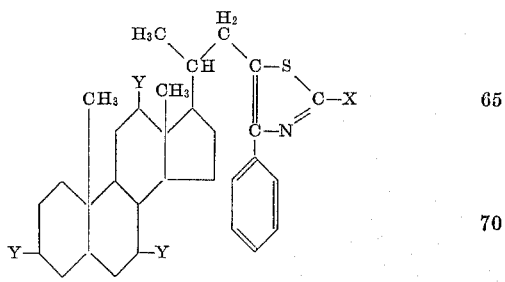

wherein X is a member of the group consisting of the amino radical, the amino radical in the form of its acid addition salts, and acyl-substituted amino radicals wherein the acyl substituents are selected from the group consisting of benzoyl and lower alkanoyl radicals; and Y is a member of the group consisting of hydrogen and the hydroxyl and acetoxyl radicals.

2. 2-amino-5-(22-bisnorcholanyl)-4-phenylthiazole, having the formula

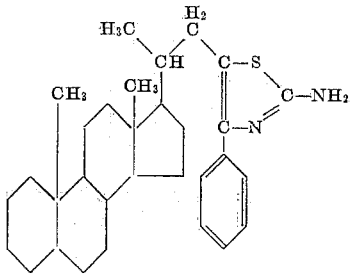

3. A bisnorcholanylthiazole of the formula

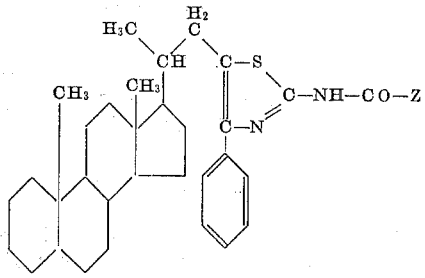

wherein Z is lower alkyl.

4. 2-(N-acetylamino)-5-(22-bisnorcholanyl)-4-phenylthiazole, having the formula

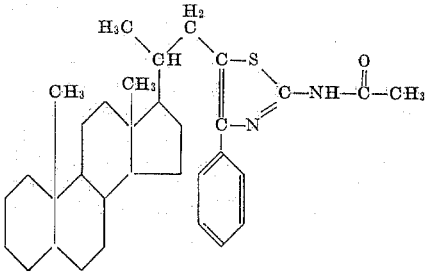

5. 2-amino-5-(22-bisnordesoxycholyl)-4-phenylthiazole, having the formula

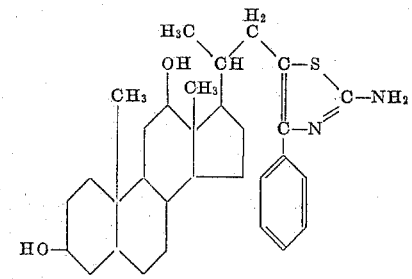

6. 2-amino-5-(22-bisnorcholyl)-4-phenylthiazole, having the formula

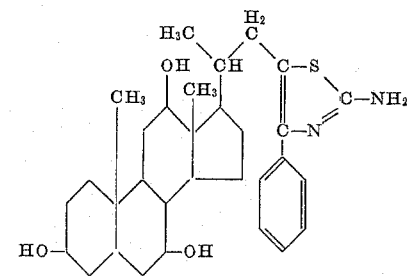

7. 2 - (N - benzoylamino) - 5 - [22 - (3,12 - diacetoxybisnorcholanyl)]-4-phenylthiazole, having the formula

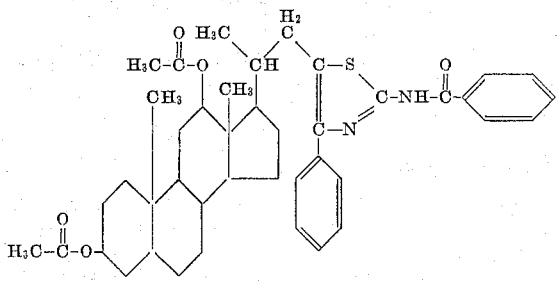

8. In a process for preparing a compound selected from the group consisting of bisnorcholanylthiazoles of the formula

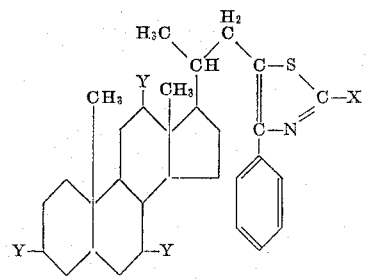

wherein X is a member of the group consisting of the amino radical, the amino radical in the form of its acid addition salts and acyl-substituted amino radicals wherein the acyl substituents are selected from the group consisting of benzoyl and lower alkanoyl radicals; and Y is a member of the group consisting of hydrogen and the hydroxyl and acetoxyl radicals, the steps which comprise halogenating a cholanyl phenyl ketone with an agent selected from the group consisting of chlorine and bromine in an inert, anhydrous, organic solvent at moderate temperatures to produce the corresponding 23-halo derivative, condensing said halo derivative in lower alcohol solution with thiourea, and isolating these products.

9. In a process for preparing a compound selected from the group consisting of bisnorcholanylthiazoles of the formula

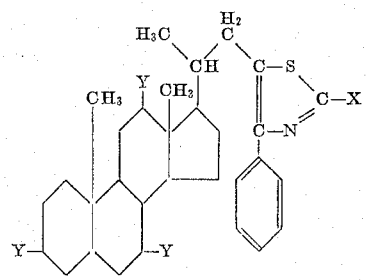

wherein X is a member of the group consisting of the amino radical, the amino radical in the form of its acid addition salts, and acyl-substituted amino radicals wherein the acyl substituents are selected from the group consisting of benzoyl and lower alkanoyl radicals; and Y is a member of the group consisting of hydrogen and the hydroxyl and acetoxyl radicals, the steps which comprise halogenating a cholanyl phenyl ketone with bromine in the presence of acetic acid solvent at moderate temperatures to produce the corresponding 23-bromo derivative, condensing said bromo derivative in lower alcohol solution with thiourea, and isolating these products.

10. In a process for preparing a compound selected from the group consisting of bisnorcholanylthiazoles of the formula

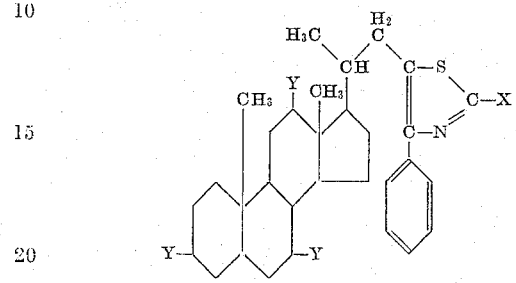

wherein X is a member of the group consisting of the amino radical, the amino radical in the form of its acid addition salts, and acyl-substituted amino radicals wherein the acyl substituents are selected from the group consisting of benzoyl and lower alkanoyl radicals; and Y is a member of the group consisting of hydrogen and the hydroxyl and acetoxyl radicals, the steps which comprise halogenating a cholanyl phenyl ketone with an agent selected from the group consisting of chlorine and bromine in an inert anhydrous organic solvent at moderate temperatures to produce the corresponding 23-halo derivative, condensing said halo derivative in isopropyl alcohol solution with thiourea, and isolating these products.

11. In a process for preparing a compound selected from the group consisting of bisnorcholanylthiazoles of the formula

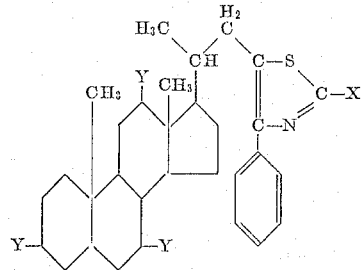

wherein X is a member of the group consisting of the amino radical, the amino radical in the form of its acid addition salts, and acyl-substituted amino radicals wherein the acyl substituents are selected from the group consisting of benzoyl and lower alkanoyl radicals; and Y is a member of the group consisting of hydrogen and the hydroxyl and acetoxyl radicals, the steps which comprise halogenating a cholanyl phenyl ketone with bromine in acetic acid at moderate temperatures to produce the corresponding 23-bromo derivative, condensing said bromo derivative in isopropyl alcohol solution with thiourea, and isolating these products.

No references cited.